United States Patent [19]
Curry

[11] Patent Number: 5,953,982
[45] Date of Patent: Sep. 21, 1999

[54] DEVICE FOR PREVENTING DRY BOILING OF A PAN

[76] Inventor: Wayne Curry, 13. Bellflower Path, Harold Hill, Romford, United Kingdom, UK RM3 8JE

[21] Appl. No.: 08/974,058

[22] Filed: Nov. 19, 1997

[51] Int. Cl.⁶ .................................................. A23L 31/12
[52] U.S. Cl. ................................ 99/344; 340/624; 73/307
[58] Field of Search ........................... 99/342, 344, 403, 99/493, 487, 330, 337; 73/305, 307; 340/624, 623, 604

[56] References Cited

U.S. PATENT DOCUMENTS

| | | | |
|---|---|---|---|
| 3,968,686 | 7/1976 | O'Neal | 99/342 |
| 4,308,725 | 1/1982 | Chiyoda | 340/623 |
| 4,748,300 | 5/1988 | Anderson | 340/624 |
| 4,757,305 | 7/1988 | Peso | 340/624 |
| 4,814,752 | 3/1989 | Lehman | 340/623 |
| 5,079,407 | 1/1992 | Baker | 340/602 |

*Primary Examiner*—David Lacey
*Assistant Examiner*—Hao Mai

[57] ABSTRACT

A device for preventing the complete evaporation of boiling food within a cooking pan is provided including a housing releasably connected to a pan. Further provided is an indicator mechanism situated on the housing and adapted to provide an indication upon the receipt of power. Associated therewith is a detection mechanism situated on the housing for supplying the indicator mechanism with power upon the detection of an absence of liquid within the pan.

4 Claims, 2 Drawing Sheets

DEVICE FOR PREVENTING DRY BOILING OF A PAN

BACKGROUND OF THE INVENTION

1. Field of the Invention

The present invention relates to temperature cut off devices and more particularly pertains to a new device for preventing dry boiling of a pan for preventing the damaging of a pan with a device that is releasably attached thereto.

2. Description of the Prior Art

The use of temperature cut off devices is known in the prior art. More specifically, temperature cut off devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art temperature cut off devices include U.S. Pat. No. 4,493,981; U.S. Pat. No. 5,079,407; U.S. Pat. No. Des. 313,567; U.S. Pat. No. 5,297,474; U.S. Pat. No. 5,341,728; and U.S. Pat. No. 5,072,616.

In these respects, the device for preventing dry boiling of a pan according to the present invention substantially departs from the conventional concepts and designs of the prior art, and in so doing provides an apparatus primarily developed for the purpose of preventing the damaging of a pan with a device that is releasably attached thereto.

SUMMARY OF THE INVENTION

In view of the foregoing disadvantages inherent in the known types of temperature cut off devices now present in the prior art, the present invention provides a new device for preventing dry boiling of a pan construction wherein the same can be utilized for preventing the damaging of a pan with a device that is releasably attached thereto.

The general purpose of the present invention, which will be described subsequently in greater detail, is to provide a new device for preventing dry boiling of a pan apparatus and method which has many of the advantages of the temperature cut off devices mentioned heretofore and many novel features that result in a new device for preventing dry boiling of a pan which is not anticipated, rendered obvious, suggested, or even implied by any of the prior art temperature cut off devices, either alone or in any combination thereof.

To attain this, the present invention generally comprises a housing with a rectilinear configuration having a top square face, a bottom square face, and a periphery. Such periphery is defined by four rectangular side faces forming an interior space. The housing is preferably constructed from a heat resistant material. Next provided is a hollow arm having an inverted L-shaped configuration. The hollow arm includes a short horizontal portion integrally coupled at a first end thereof to a central extent of a top edge of one of the rectangular side faces of the housing. The short horizontal portion extends outwardly front the housing in coplanar relationship with the top face. Associated therewith is a long vertical portion having a top end integrally coupled to a second end of the short horizontal portion. The long vertical portion extends downwardly from the short horizontal portion such that a lower end of the long vertical portion extends below the bottom square face of the housing. It is imperative that the lower end of the long vertical portion be open. As shown in FIG. 1, a speaker is situated within the interior space of the housing adjacent to a grill formed in the top face thereof. During use, the speaker is adapted for emitting an audible sound therefrom upon the receipt of power. A light is positioned on the top face of the housing and is adapted to illuminate upon the receipt of power. As shown in FIG. 3, a hollow plastic ball with a conductive shell formed thereon is provided. The ball is slidably situated within the long vertical portion of the hollow arm and is adapted to float in water. Lastly, a pair of spaced contacts are mounted within the long vertical portion of the hollow arm adjacent the lower end thereof. As shown in FIG. 3, the contacts are connected between a battery situated within the interior space of the housing and both the light and the speaker. In use, the contacts serve to allow power to be supplied to the light and the speaker only upon the abutment thereof by the ball when the ball resides adjacent the lower end of the long vertical portion of the hollow arm.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new device for preventing dry boiling of a pan apparatus and method which has many of the advantages of the temperature cut off devices mentioned heretofore and many novel features that result in a new device for preventing dry boiling of a pan which is not anticipated, rendered obvious, suggested, or even implied by any of the prior art temperature cut off devices, either alone or in any combination thereof.

It is another object of the present invention to provide a new device for preventing dry boiling of a pan which may be easily and efficiently manufactured and marketed.

It is a further object of the present invention to provide a new device for preventing dry boiling of a pan which is of a durable and reliable construction.

An even further object of the present invention is to provide a new device for preventing dry boiling of a pan which is susceptible of a low cost of manufacture with regard to both materials and labor, and which accordingly is then susceptible of low prices of sale to the consuming public, thereby making such device for preventing dry boiling of a pan economically available to the buying public.

Still yet another object of the present invention is to provide a new device for preventing dry boiling of a pan which provides in the apparatuses and methods of the prior art some of the advantages thereof, while simultaneously overcoming some of the disadvantages normally associated therewith.

Still yet another object of the present invention is to provide a new device for preventing dry boiling of a pan for preventing the damaging of a pan with a device that is releasably attached thereto.

Even still another object of the present invention is to provide a new device for preventing dry boiling of a pan that includes a housing releasably connected to a pan. Further provided is an indicator mechanism situated on the housing and adapted to provide an indication upon the receipt of power. Associated therewith is a detection mechanism situated on the housing for supplying the indicator mechanism with power upon the detection of an absence of liquid within the pan.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
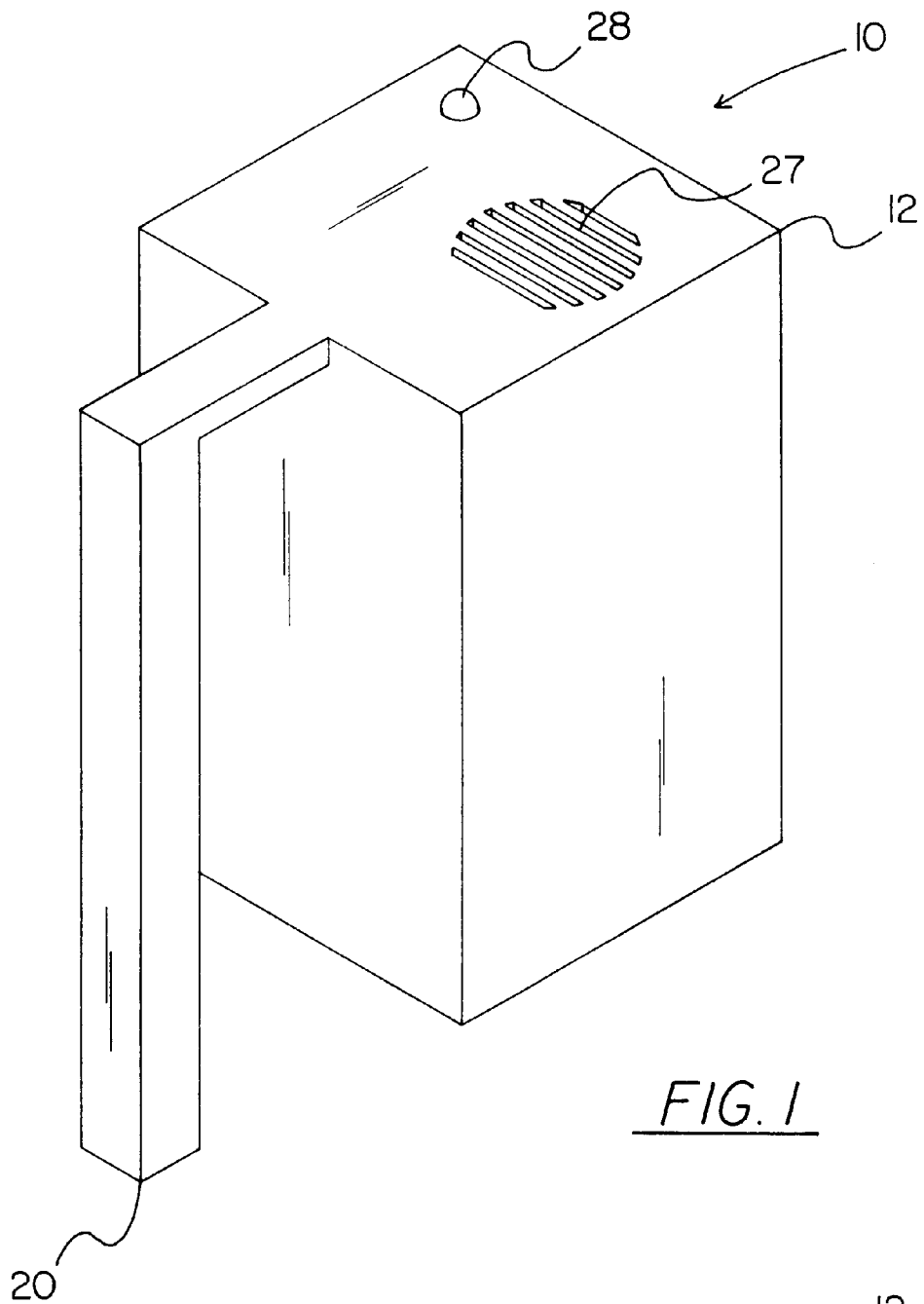
FIG. 1 is a perspective view of a new DEVICE FOR preventing dry boiling of a pan according to the present invention.
Figure 2:
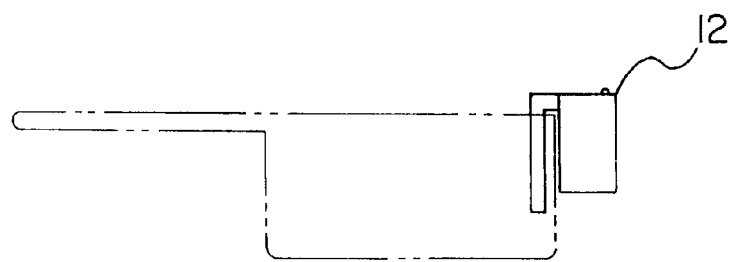
FIG. 2 is a side view of the present invention in use.

With reference now to the drawings, and in particular to FIGS. 1 through 4 hereof, a new device for preventing dry boiling of a pan embodying the principles and concepts of the present invention and generally designated by the reference numeral 10 will be described.

The present invention, as designated as numeral 10, includes a housing 12 with a rectilinear configuration having a top square face 14, a bottom square face 16, and a periphery 18. Such periphery is defined by four rectangular side faces forming an interior space. The housing is preferably constructed from a heat resistant material.

Next provided is a hollow arm 20 having an inverted L-shaped configuration. The hollow arm includes a short horizontal portion 22 integrally coupled at a first end thereof to a central extent of a top edge of one of the rectangular side faces of the housing. The short horizontal portion extends outwardly from the housing in coplanar relationship with the top face. Associated therewith is a long vertical portion 24 having a top end integrally coupled to a second end of the short horizontal portion. The long vertical portion extends downwardly from the short horizontal portion such that a lower end of the long vertical portion extends below the bottom square face of the housing. It is imperative that the lower end of the long vertical portion be open.

As shown in FIG. 1, a speaker 26 is situated within the interior space of the housing adjacent to a waterproof grill 27 formed in the top face thereof. During use, the speaker is adapted for emitting an audible sound therefrom upon the receipt of power. A light 28 is positioned on the top face of the housing and is adapted to illuminate upon the receipt of power.

Figure 3:
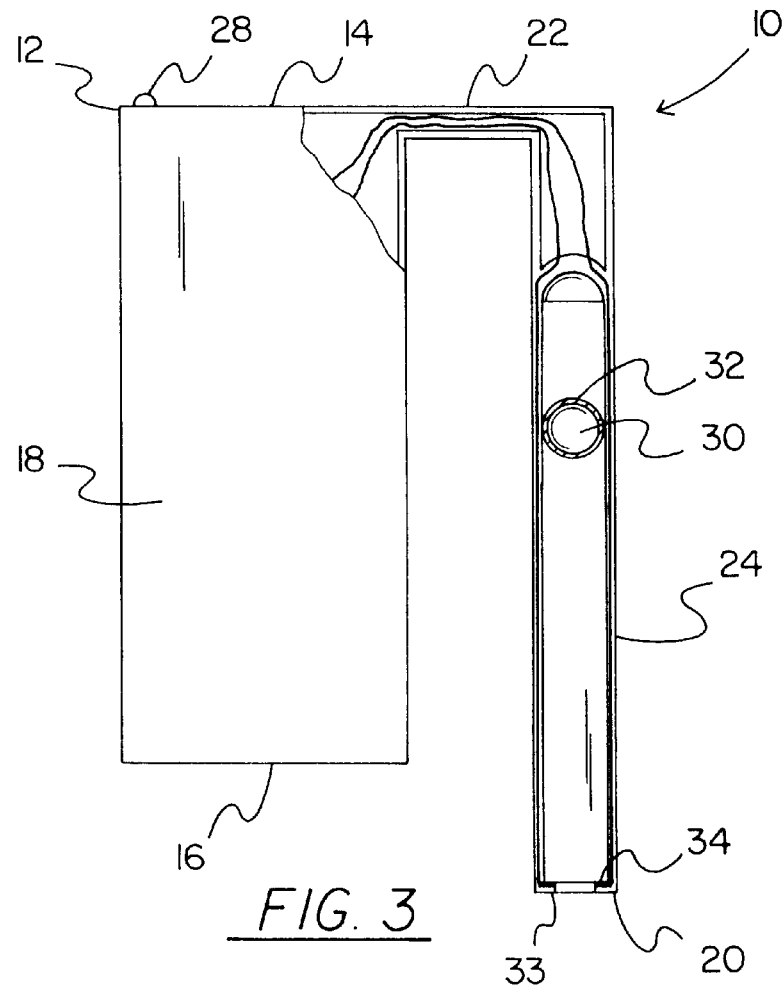
FIG. 3 is a side view of the present invention.
Figure 4:
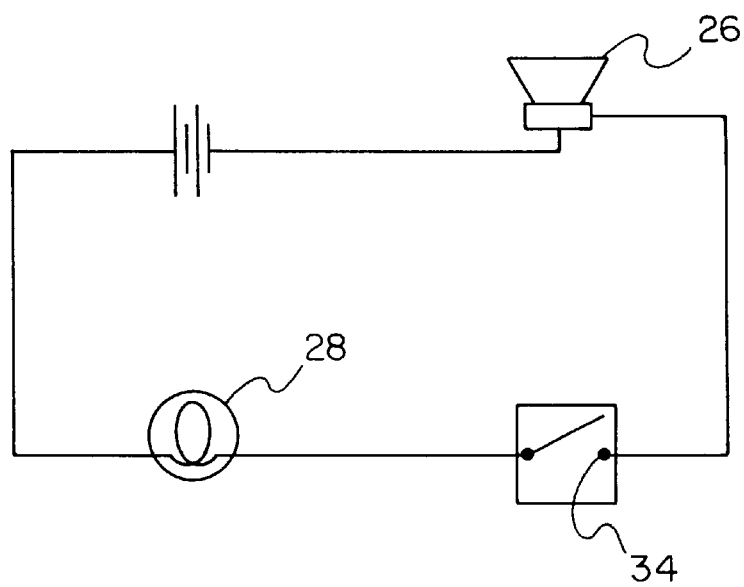
FIG. 4 is a schematic diagram of the present invention.

As shown in FIG. 3, a hollow plastic ball 30 with a conductive shell 32 formed thereon is provided. The ball is slidably situated within the long vertical portion of the hollow arm and is adapted to float in water. An annular inwardly extending flange 33 is ideally formed at the lower end of the long vertical portion of the hollow arm to preclude the ball from inadvertently exiting the arm.

Lastly, a pair of spaced contacts 34 are mounted within the long vertical portion of the hollow arm adjacent the lower end thereof. As shown in FIG. 3, the contacts are connected between a battery situated within the interior space of the housing and both the light and the speaker. Such connection is preferably accomplished by way of insulated wires extending through the hollow arm within a plastic from which it is constructed.

In use, the contacts serve to allow power to be supplied to the light and the speaker only upon the abutment thereof by the ball when the ball resides adjacent the lower end of the long vertical portion of the hollow arm. While not shown, preferably included is a manual switch mounted on the housing for allow a user to selectively preclude the transmission of power to the light and speaker. Further, a stopper or block is preferably integrally formed within the long vertical portion of the hollow arm above the ball to prevent liquid from entering the housing.

Further during operation, the housing is mounted on the cooking pan with the long vertical portion situated within the cooking pan. Upon any liquid within the pan being completely evaporated therefrom, the ball drops and abuts the contacts thereby warning a user to prevent damage to the pan by removing it from the source of heat.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A device for preventing the complete evaporation of boiling food within a cooking pan comprising, in combination:

a housing with a rectilinear configuration having a top square face, a bottom square face, and a periphery defined by four rectangular side faces forming an interior space, the housing constructed from a heat resistant material;

a hollow arm having an inverted L-shaped configuration including a short horizontal portion integrally coupled at a first end thereof to a central extent of a top edge of one of the rectangular side faces of the housing and extending outwardly therefrom in coplanar relationship with the top face of the housing and a long vertical portion having a top end integrally coupled to a second end of the short horizontal portion and extending downwardly therefrom such that a lower end of the long vertical portion extends below the bottom square face of the housing in parallel relationship with one of the side faces of the housing to define a slot therebetween adapted for receiving an edge of a pan, the lower end of the long vertical portion being open with an inwardly extending flange which defines an opening situated about a vertical axis;

a speaker situated within the interior space of the housing adjacent to a waterproof grill formed in the top face thereof for emitting an audible sound therefrom upon the receipt of power;

a light positioned on the top face of the housing and adapted to illuminate upon the receipt of power;

a hollow plastic ball with a conductive shell formed thereon, the ball being slidably situated within the long vertical portion of the hollow arm and adapted to float in water;

a pair of spaced contacts situated within the long vertical portion of the hollow arm adjacent the lower end thereof and terminating on an inner surface of the flange, the contacts connected between a battery situated within the interior space of the housing and both the light and the speaker via insulated wires formed within plastic from which the hollow arm is formed, the contacts adapted to allow power to be supplied to the light and the speaker only upon the abutment thereof by the ball when the ball resides adjacent the lower end of the long vertical portion of the hollow arm;

a manual switch mounted on the housing for allowing a user to selectively preclude the transmission of power to the light and the speaker; and a stopper integrally formed within the long vertical portion of the hollow arm above the ball to prevent liquid from entering the housing;

whereby the housing is mounted on the cooking pan with the long vertical portion situated within the cooking pan such that upon any liquid being completely evaporated therefrom, the ball drops and abuts the contacts thereby warning a user to prevent damage to the pan.

2. A device for preventing the complete evaporation of boiling food within a cooking pan comprising:

a housing releasably connected to a pan and having an interior space;

a speaker situated in the interior space of the housing adjacent to a waterproof grill formed in the housing for emitting an audible sound from the speaker upon the receipt of power;

a hollow arm having an inverted L-shaped configuration including a short horizontal portion integrally coupled at a first end thereof to a top edge of a side face of the housing and extending outwardly therefrom in coplanar relationship with a top face of the housing and a long vertical portion having a top end integrally coupled to a second end of the short horizontal portion and extending downwardly therefrom such that a lower end of the long vertical portion extends below a bottom square face of the housing in parallel relationship with the side face of the housing to define a slot therebetween adapted for receiving an edge of a pan, the lower end of the long vertical portion being open with an inwardly extending flange which defines an opening situated about a vertical axis;

a hollow conductive ball being slidably situated within the long vertical portion of the hollow arm and adapted to float in water;

a pair of spaced contacts situated within the long vertical portion of the hollow arm adjacent the lower end thereof and terminating on an inner surface of the flange, the contacts connected between a battery situated in the interior space of the housing and the speaker via insulated wires formed in plastic from which the housing is formed;

a manual switch mounted on the housing for allowing a user to selectively preclude the transmission of power to the speaker; and indicator means situated on the housing and adapted to provide an indication upon the receipt of power when the conductive ball abuts the spaced contacts.

3. A device as set forth in claim 2 wherein the indication means includes a light positioned on the housing and adapted to illuminate upon the receipt of power.

4. A device as set forth in claim 2 wherein a stopper is integrally formed within the long vertical portion of the hollow arm above the ball to prevent liquid from entering the housing:

a stopper integrally formed within the long vertical portion of the hollow arm above the ball to prevent liquid from entering the housing;

whereby the housing is mounted on the cooking pan with the long vertical portion situated within the cooking pan such that upon any liquid being completely evaporated therefrom, the ball drops and abuts the contacts thereby warning a user to prevent damage to the pan.

* * * * *